United States Patent [19]
Teshima et al.

[11] Patent Number: 5,755,282
[45] Date of Patent: May 26, 1998

[54] AIR CONDITIONING APPARATUS PREVENTING MISTING

[75] Inventors: Takashi Teshima, Nishio; Tetsumi Ikeda, Anjo, both of Japan; David Richard Bradley, Coventry, England

[73] Assignees: Nippondenso Co., Ltd., Kariya, Japan; Jaguar Cars Limited, Coventry, United Kingdom

[21] Appl. No.: 697,092

[22] Filed: Aug. 20, 1996

Related U.S. Application Data

[63] Continuation of Ser. No. 593,331, Jan. 31, 1996, abandoned.

[30] Foreign Application Priority Data

Feb. 1, 1995 [JP] Japan ................... 7-015069

[51] Int. Cl.$^6$ .............. F25B 29/00; B60H 1/00; B60H 1/02; B60H 1/04
[52] U.S. Cl. ............ 165/202; 165/230; 165/232; 165/263; 165/264; 165/42; 165/43; 62/229; 62/173
[58] Field of Search ................. 165/202, 230, 165/232, 263, 264, 42, 43; 62/229, 173

[56] References Cited

U.S. PATENT DOCUMENTS

| | | | |
|---|---|---|---|
| 4,566,528 | 1/1986 | Helmte et al. | 165/264 |
| 4,766,950 | 8/1988 | Yamada et al. | 165/202 |
| 4,848,444 | 7/1989 | Heinle et al. | 165/202 |
| 4,865,119 | 9/1989 | Okada et al. | |
| 4,877,081 | 10/1989 | Ohtsu | 62/229 |

*Primary Examiner*—John K. Ford
*Attorney, Agent, or Firm*—Cushman Darby & Cushman IP Group of Pillsbury Madison & Sutro LLP

[57] ABSTRACT

An air-conditioning apparatus for use in a vehicle includes bypass means for forming a bypass duct to allow the air which has passed through an evaporator to bypass an heater core, opening/closing means for opening and closing the bypass duct, and refrigerant control means for switching between a supply state in which refrigerant is supplied to the evaporator to a stop state in which the supply of the refrigerant to the evaporator is stopped based on a temperature of air having just passed through the evaporator. When it is determined that a physical amount relating to the temperature of the air introduced into a casing is greater than a predetermined amount and when the control state of the refrigerant control means is switched from the stop state to the supply state, the bypass duct is closed for a first predetermined time period by control means with the opening/closing means. In this way, it is possible to prevent the foggy air from being generated.

12 Claims, 8 Drawing Sheets

AIR CONDITIONING APPARATUS PREVENTING MISTING

This is a Continuation of National application Ser. No. 08/593,331 filed Jan. 31, 1996, now abandoned.

BACKGROUND OF THE INVENTION

1. Field of the Invention

The present invention relates to an air conditioning apparatus for use in a vehicle and more particularly, to a control method of an air conditioning apparatus to prevent foggy air from being generated.

2. Description of the Prior Art

Temperature-adjusting methods adopted in conventional air conditioning apparatuses for use in vehicles can be generally classified into an air-mixing method and a reheating method. In the air-mixing method, conditioned air having a desired temperature is obtained by controlling the mixing ratio between the amount of warm air which has passed through a heater core after passing through an evaporator and that of cold air which has bypassed the heater core with an air-mixing door.

In the reheating method, at least some of the air which has passed through the evaporator passes through the heater core, regardless of air conditioning operation mode. In this method, conditioned air having a desired temperature is obtained by controlling a flow rate of water flowing through the heater core or by controlling a duty ratio between an ON (supply) time period and an OFF (stop) time period of the water flowing through the heater core.

Figure 1:
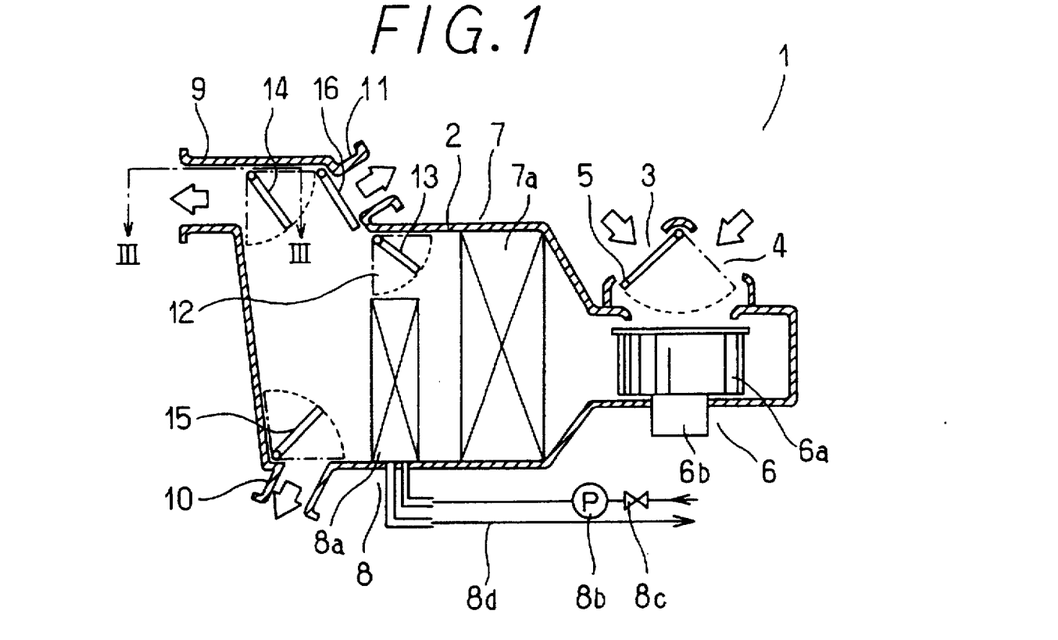
FIG. 1 is a block diagram showing an entire construction for the air flow of an air conditioning apparatus according to an embodiment of the present invention.

Further, in the reheating method, some of the air which has passed through the evaporator bypasses the heater core, as shown in FIG. 1 in order to secure a cooling performance of the air conditioning apparatus when the temperature drops in a summer season and keeps a passenger's head cool and a passenger's feet warm to satisfy the passenger's sense of warmth in a bi-level mode, i.e., an air conditioning operation mode where air is blown toward an upper half of the passenger's body and warm air is blown toward a lower half of the passenger's body.

The air conditioning apparatus of the above-described two types has a problem in that foggy air is sometimes blown out from the air outlet to a passenger compartment, which may make the passenger uncomfortable. It seems that such foggy air is generated by a mixture between cold air, the relative humidity of which is 100%, and warm air, the relative humidity of which is also 100%. It is known that the foggy air is caused by a non-uniform temperature distribution in the evaporator.

As a result of research by the inventors, they have found that in addition to the non-uniform temperature distribution of the evaporator due to the structure, the foggy air is caused in a particular air conditioning state, which is described below in detail.

As described above, the foggy air is generated by the mixture between the cold air having a relative humidity at 100% which has passed through the evaporator and the warm air having a relative humidity at 100% which has passed through the heater core. More specifically, the air which has passed through the evaporator and thus has a low temperature has relative humidity at 100%. The air which has passed through the heater core and thus has a high temperature should have a relative humidity less than 100%. Accordingly, the foggy air should not be generated.

The inventors found, however, that in summer season when the temperature of outside air is high, vapor condenses on a surface of the evaporator, condensed water is blown to the heater core by an air flow generated by a blower, and a water content adheres to a surface of the heater core. Therefore, it turns out that the air passing through the heater core absorbs the water which has adhered to the surface of the heater core, thus keeping its relative humidity at 100% even though the air is heated by the heater core.

That is, the relative humidity of the air should decrease because the heater core heats the air, but the air absorbs the water content which has adhered to the heater core when the air passes through the heater core. As a result, a temperature of the air conditioned air rises, but its relative humidity does not decrease. Thus, the air keeps its relative humidity at 100%. That is, the air which has its relative humidity at 100% and has cooled by the evaporator mixes with the conditioned air which has its relative humidity at 100% and has been heated by the heater core, with the result that the foggy air is generated.

As a result of further research by the inventors in consideration of the above fact, they have found that the foggy air is likely to be generated, when a compressor (or clutch) which determines a supply or non-supply of refrigerant to the evaporator is turned on with an operation of the air conditioning apparatus.

That is, when the air conditioning apparatus is operated, there is a high possibility that the water content which has blown off from the evaporator in the previous operation of the air conditioning apparatus has stayed on the heater core. Accordingly, when the air conditioning apparatus is operated and the clutch is turned on, refrigerant is supplied to the evaporator. As a result, as described above, the air which has passed through the evaporator is cooled and has a relative humidity at 100%, whereas the air which has passed through the heater core has a temperature higher than the air which has passed through the evaporator, thus keeping its relative humidity at 100% because it absorbs the water content which has adhered to the heater core. Even in a state where no hot water flows through the heater core, the heater core keeps a small amount of heat from a source of hot water. Thus, the heater core is constantly warm.

Accordingly, when the compressor is turned on with the operation of the air conditioning apparatus, no foggy air is generated if the air which has passed through only the evaporator and the air which has passed through the heater core is prevented from being mixed with each other.

SUMMARY OF THE INVENTION

It is accordingly an object of the present invention to provide an air conditioning apparatus, for use in a vehicle, having a construction of preventing air which has passed through an evaporator and air which has passed through a heater core from mixing with each other so as to prevent the foggy air from being generated when a compressor is actuated at a high outside air temperature.

According to the present invention, an air conditioning apparatus for use in a vehicle includes bypass means for forming a bypass duct to allow the air which has passed through an evaporator to bypass a heater core, opening/closing means for opening and closing the bypass duct, and refrigerant control means for switching between a supply state, in which refrigerant is supplied to the evaporator, to a stop state, in which the supply of the refrigerant to the evaporator is stopped based on a temperature of air having just passed through the evaporator. When it is determined that a physical amount relating to the temperature of the air introduced into a casing is greater than a predetermined amount and when the control state of the refrigerant control means is switched from the stop state to the supply state by physical amount determination means, the bypass duct is closed for a first predetermined time period by control means with the opening/closing means.

That is, before the stop state is selected as the control state of the refrigerant control means, the temperature of the air introduced into the casing is greater than a predetermined temperature. Thus, refrigerant must have been supplied to the evaporator for a certain period of time. Accordingly, there is a high possibility that condensed water formed on the surface of the evaporator is fed to the heater core by air generated by the blower and adhered to the surface of the heater core.

When the refrigerant is supplied to the evaporator in the supply state switched from the stop state, the air which has been cooled by the evaporator and passes through the bypass duct has a relative humidity at 100%. The air passing through the heater core is heated thereby and thus has a temperature higher than that of the air which has passed through the evaporator, but keeps its relative humidity at 100% because it absorbs the water content which has adhered to the heater core.

When the bypass duct is open, the air which has passed through the heater core and the air which has passed through the evaporator are mixed with each other. As a result, foggy air is generated in an air-mixing chamber of the casing. However, the opening/closing means closes the bypass duct, when the control state of the refrigerant control means is switched from the stop state to the supply state. Thus, the foggy air can be prevented from being generated.

Further, when it is determined that the control state of the refrigerant control means has been switched from the stop state to the supply state by actuation determination means, the control means controls the opening/closing means to close the bypass duct for the first predetermined time period.

More specifically, the heater core may have a considerably high temperature when the air conditioning apparatus is not actuated in an atmosphere in which outside air has a high temperature. When the control state of the refrigerant control means is switched from the stop state to the supply state, the air passing through the evaporator is cooled rapidly to a considerably low temperature in the bypass duct, whereas the air which has passed through the heater core having a high temperature is heated to a temperature much higher than that of the air which has passed through the bypass duct.

When the refrigerant is supplied to the evaporator with the actuation of the air conditioning apparatus, there is a large temperature difference between the air passing through the bypass duct and the air which has passed through the heater core. The foggy air is likely to be generated in this state. As described above, the foggy air can be prevented from being generated, because the opening/closing means closes the bypass duct.

In controlling the opening/closing means to close the bypass duct, the bypass duct may be closed when the air conditioning apparatus has been stopped, without executing the above-described control after the air conditioning apparatus is actuated.

When it is determined that a physical amount relating to the temperature of the air introduced into the casing is greater than the predetermined amount by the physical amount determination means and that the control state of the refrigerant control means has been switched from the stop state to the supply state, the control means controls the opening/closing means to close the bypass duct for the first predetermined time period.

More specifically, as described above, the bypass door may be closed when the operation of the air conditioning apparatus is stopped. When the engine of the vehicle is stopped, the air conditioning apparatus is stopped. In this way, the operation sound of the opening/closing means is harsh to a driver because the engine has been already stopped when the opening/closing means is closed. Therefore, it is preferable to close the bypass duct when the engine is running.

The first predetermined time period is required to reduce the difference between the temperature of the air which has passed through the bypass duct via the evaporator and that of the air which has passed through the heater core. The foggy air can be prevented from being generated if there is no temperature difference therebetween.

It is preferable that an air conditioning apparatus further includes manual determination means for determining whether the control state of the refrigerant control means has been manually switched from the supply state to the stop state and time period determination means for clocking a time period after the manual determination means determines that the control state of the refrigerant control means has been manually switched from the supply state to the stop state, to determine whether the clocked time period has exceeded the second predetermined time period. When the time period determination means determines that the second predetermined time period has passed, the control means controls the opening/closing means to close the bypass duct for the first predetermined time period, after it is determined that the control state of the refrigerant control means has been switched from the stop state to the supply state.

More specifically, when the control state of the refrigerant control means is switched from the supply state to the stop state, the stop state is maintained unless the passenger switches the stop state to the supply state manually, irrespective of the temperature of air having just passed through the evaporator. In the stop state, the cooling performance of the evaporator declines gradually. Thus, the air which has passed through the evaporator is not cooled much. Air which has passed through the evaporator passes through the heater core at a higher temperature in the stop state than in the supply state. Thus, a heat exchange occurs to a small extent between outside air and inside air. As a result, the heating performance (temperature) of the heater core increases. The longer the stop time period of the refrigerant, the higher the temperature of the heater core.

Accordingly, when the stop time period set manually by the passenger is longer than the second predetermined time period, foggy air is likely to be generated. When the control state of the refrigerant control means is manually switched by the passenger from the stop state to the supply state, the foggy air can be prevented from being generated because the bypass dust is closed for the first predetermined time period.

It is also preferable that an air conditioning apparatus further includes cooling load determination means for determining whether a cooling load of the air conditioning apparatus in the passenger compartment is greater than a predetermined value and an opening/closing control means for prohibiting a control content of the control means from being executed when the cooling load determination means determines that the cooling load is greater than the predetermined value, to control the operation of the opening/closing means according to the degree of the cooling load.

More specifically, when it is determined that the cooling load in the passenger compartment is greater than the predetermined value, the bypass duct is prohibited from being closed. That is, when the cooling load becomes greater than the predetermined value, a cooling load greater than the predetermined value cannot be obtained if the bypass duct is closed. As a result, a passenger's sense of coolness cannot be satisfied. Thus, when the cooling load is smaller than the predetermined value, the bypass duct is closed. In this manner, the foggy air can be prevented from being generated, with a required cooling load being obtained.

When the cooling load is greater than the predetermined value, the opening/closing control means controls the opening/closing means, depending on the degree of the cooling load so as to give priority to the cooling load, thus satisfying the passenger's desired sense of coolness.

It is further preferable that the heater core, and the opening/closing means are provided in the casing in such a manner that air which has passed through the evaporator passes through the heater core in both a state in which the bypass duct is opened and in a state in which the bypass duct is closed.

That is, air is always passing through the heater core regardless of whether the bypass duct is open or closed. Thus, foggy air is more likely to be generated in the air conditioning apparatus having the above configuration than in an air conditioning apparatus of the air-mixing type in which the supply of air to the heater core is stopped, depending on an air conditioning state, however, the foggy air can be effectively prevented from being generated by performing the above-described control method.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

An air conditioning apparatus for use in a vehicle according to an embodiment of the present invention is described below with reference to drawings. First, the entire structure of the air conditioning apparatus according to the embodiment is described below with reference to FIGS. 1 through 4.

An air conditioning apparatus 1 includes a casing 2 serving as an air duct for introducing air into a passenger compartment. There are formed, on the upstream side of the casing 2, an inside air inlet 3 for sucking air existing in the passenger compartment to the casing 2 and an outside air inlet 4 for sucking outside air thereto. Thus, the air inside the casing 2 flows from the right-hand side (upstream side) thereof to the left-hand side (downstream side) thereof. The ratio of the degree of opening of the inside air inlet 3 and that of the outside air-sucking port 4 are adjusted by an inside air/outside air-switching door 5 which is driven by a driving means 32 such as a servo motor shown in FIG. 4.

An air blower 6, a cooling means 7, and heating means 8 are provided inside the casing 2 in this order from the upstream side toward the downstream side. Air which has passed through the heating means 8 is blown to the passenger compartment from each of branch ducts 9 through 11 formed at downstream ends of the casing 2. The blower 6 includes a fan 6a and a fan motor 6b for driving the fan 6a according to a blower voltage applied to the fan motor 6b from a driving circuit 33 shown in FIG. 4 so that the fan 6a blows inside air or outside air to the passenger compartment through the casing 2.

Figure 2:
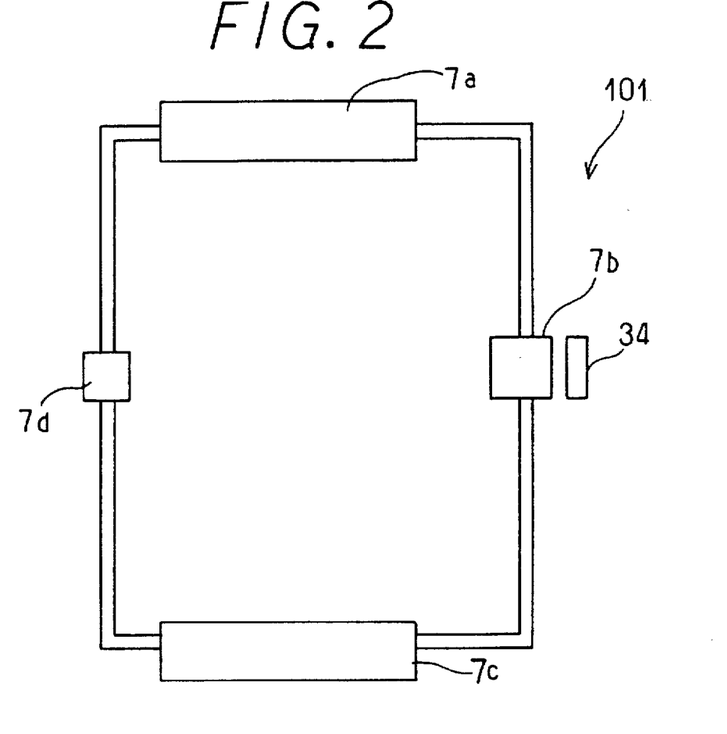
FIG. 2 is a schematic view showing a refrigerant cycle of the embodiment.

The cooling means 7 for cooling air passing therethrough includes an evaporator 7a for a refrigerating cycle 101 shown in FIG. 2. In addition to the evaporator 7a, the refrigerating cycle 101 includes a compressor 7b, a condenser 7c, and a pressure-reducing means 7d consisting of, for example, an expansion valve. As shown in FIG. 2, these components 7a, 7b, 7c, and 7d are connected to each other by means of a refrigerating pipe. The compressor 7b is connected with an engine 8 (not shown) via an electromagnetic clutch 34 shown in FIGS. 2 and 4. The power of the engine is transmitted to the compressor 7b when the electromagnetic clutch 34 is turned on.

As shown in FIG. 1, the heating means 8 includes a heater core 8a, a water pump 8b, and a water valve 8c. The heater core 8a heats cold air fed thereto from the evaporator 7a, by using engine-cooling water flowing therethrough as the heating source thereof. The water pump 8b generates a flow of hot water in a hot water-feeding pipe 8d connecting the heater core 8a and the engine to each other.

The water valve 8c adjusts the amount of the hot water to be supplied to the heater core 8a from the engine via the hot water pipe 8d. The temperature of the hot water flowing inside the heater core 8a, namely, the air-heating performance of the heater core 8a is adjusted by controlling the opening degree of the water valve 8c or the ON-OFF time period of the water valve 8c.

Figure 4:
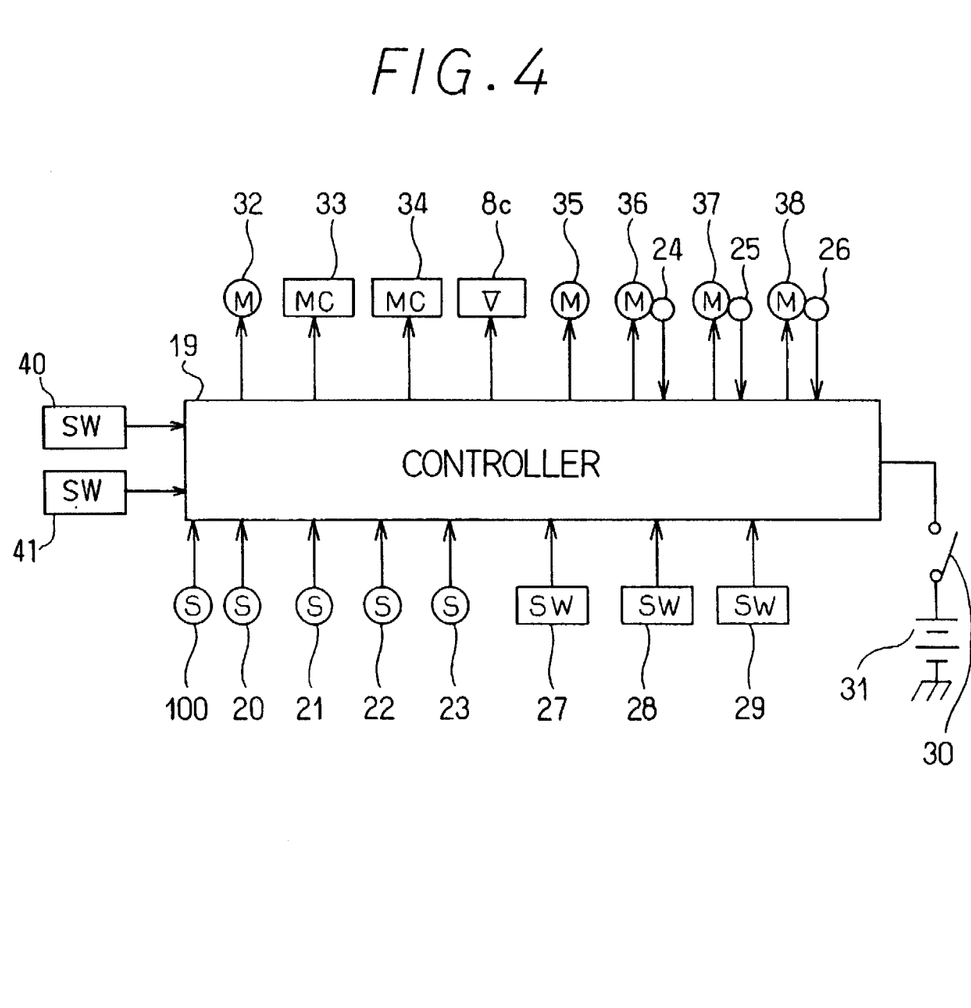
FIG. 4 is a block diagram showing a control system of the air conditioning apparatus according to the embodiment.

Further, there is provided in the casing 2 a bypass duct 12 for allowing cold air delivered from the evaporator 7a to bypass the heater core 8a. The bypass duct 12 is provided with a bypass door 13 for opening and closing the bypass duct 12. The bypass door 13 is driven by a driving means 35 consisting of a servo motor, as shown in FIG. 4. The bypass duct 12 and the heater core 8a are positioned side by side in the casing 2, as shown in FIG. 1.

The branch duct 9 serving as a face duct having an air outlet (not shown) formed at the downstream end thereof blows conditioned air toward the upper half of a passenger's body in the passenger compartment. The branch duct 10 serving as a foot duct having an air outlet (not shown) formed at the downstream end thereof blows the conditioned air toward the passenger's feet. The branch duct 11 serving as a defroster duct having an air outlet (not shown) formed at the downstream end thereof blows the conditioned air toward the inner surface of the windshield glass of the vehicle.

As shown in FIG. 1, a face door 14, a foot door 15, and a defroster door 16 for opening and closing the branch duct 9, 10, and 11, respectively are provided at the entrance of each of the branch ducts 9, 10, and 11. The face door 14, the foot door 15, and the defroster door 16 are driven by driving means consisting of servo motors 36, 37, and 38, respectively.

Figure 3:
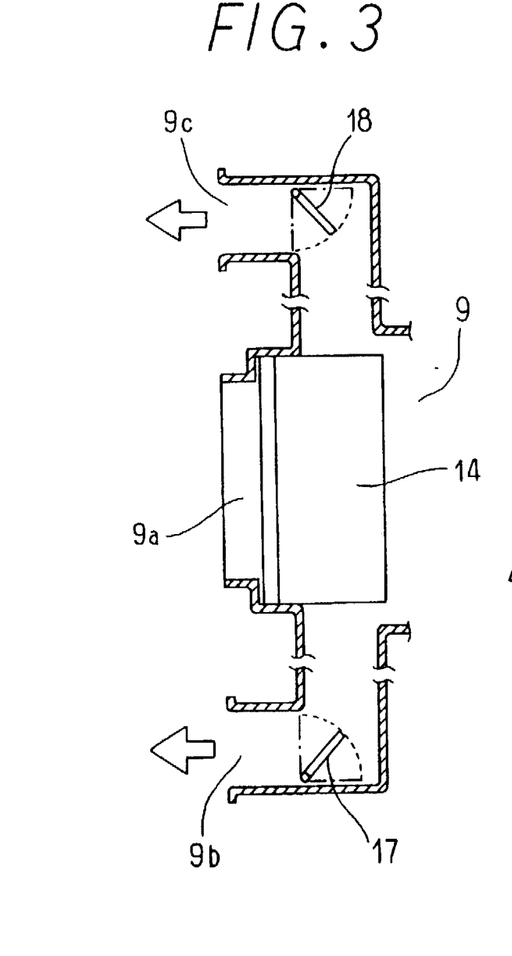
FIG. 3 is a cross sectional view taken along a line III—III of FIG. 1 for showing a branch duct.

As shown in FIG. 3 showing, the branch duct 9, taken along a line III—III of FIG. 1, the branch duct 9 includes a center face duct 9a having a center air outlet (not shown) formed at the downstream end thereof; and side face ducts 9b and 9c each having an air outlet (not shown) formed at the downstream end thereof. The air outlet of the center face duct 9a is positioned at an upper front center portion of passenger compartment to blow out conditioned air toward each center side of the upper part of the passengers' bodies, whereas the air outlets of the side face duct 9b and the side face duct 9c are positioned at an upper front left-hand and right-hand side portions of the passenger compartment to blow out conditioned air toward the left-hand side of the upper part of the passenger's body in the left-hand front seat and the right-hand side of the upper part of the passenger's body in the right-hand front seat.

As indicated in FIG. 3, the face door 14 does not open and close toward the side face ducts 9b and 9c, but does open and close toward the center face duct 9a. Side face doors 17 and 18 linked with the face door 14 by a mechanical connecting means such as a link are provided between the face door 14 and the exit of the side face duct 9b and between the face door 14 and the exit of the side face duct 9c, respectively.

When the door 14 fully opens toward the center face duct 9a in a face blow-out mode, the side face doors 17 and 18 fully open the side face ducts 9b and 9c, respectively, whereas when the face door 14 opens toward the center face duct 9a half in a bi-level blow-out mode, the side face doors 17 and 18 open the side face ducts 9b and 9c halfway, respectively.

When the face door 14 fully closes the center face duct 9a in a foot blow-out mode, a foot defroster blow-out mode or a defroster blow-out mode, the side face doors 17 and 18 are located at positions to fully close the side face ducts 9b and 9c, respectively. However, gaps are provided between the side face door 17 and the side face duct 9b and between the side face door 18 and the side face duct 9c, respectively. Thus, even when the side face ducts 9b and 9c are fully closed, a small amount of air leaks from the air outlet of each of the side face ducts 9b and 9c.

As shown in FIG. 4, a controller 19 for controlling the operation of the air-conditioning apparatus is connected to a sensor 20 for detecting the temperature of the inside air in the passenger compartment; a sensor 21 for detecting the temperature of the outside air; an insolation sensor 22 for detecting the amount of sunlight incident to the windshield; a water temperature sensor 23 for detecting the temperature of the engine-cooling water which flows into the heater core 8a; and a sensor 100 for detecting the temperature Te of air just having passed through the evaporator 7a or the nearby air. These sensors 20, 21, 22, 23, and 100 output signals to the controller 19.

The controller 19 is also connected to detecting means 24 for detecting the actual opening degree of the face door 14; detecting means 25 for detecting the actual opening degree of the foot door 15; and detecting means 26 for detecting the actual opening degree of the defroster door 16. These detecting means 24, 25, and 26 output signals to the controller 19. Each of the detecting means 24, 25, and 26 composed of a potentiometer is installed directly on each of the servomotors 36, 37, and 38.

The controller 19 is also connected to a temperature setting switch 27 for setting a desired temperature Tset of the air in the passenger compartment; a defroster switch 28 for setting a defroster mode as the blow-out mode; a blow-out mode-setting switch 29 for setting a face mode, a bi-level mode, a foot mode or a foot defroster mode as the blow-out mode; an A/C switch 40 for manually switching the operation of the compressor 7b on or off by using the electromagnetic clutch 34; an automatic switch 41 for automatically controlling the operation of the compressor 7b and the heating performance of the heater core 8a, based on the signals outputted from the sensors 20, 21, 22, 23, and 100 so as to provide the passenger compartment with conditioned air having the desired temperature Tset set by the temperature-setting switch 27. The defroster mode, the face mode, the bi-level mode, the foot mode, and the foot defroster mode will be described later.

In this embodiment, the lowest temperature 17° C. and the highest temperature 33° C. are set by the temperature setting switch 27. But actually, it is possible to set the lowest temperature at Lo at which the maximum cooling performance can be obtained, and the highest temperature at Hi at which the maximum heating performance can be obtained. The temperature-setting switch 27, the defroster switch 28, the blow-out mode-setting switch 29, and the A/C switch 40 installed on an operation panel (not shown) are operated by the passenger.

The controller 19 has a known configuration and includes an A/D converter (not shown), a microcomputer (not shown), and the like. The output analog signals of the sensors 20 through 26 are inputted to the controller 19 after they are converted into digital signals by an A/D converter. As well known, the microcomputer comprises a CPU, a ROM, a RAM, an I/O and the like although they are not shown in FIG. 4. When an ignition switch 30 of the engine is turned on, the power is supplied from a battery 31 to the microcomputer.

Upon receipt of the signals from the sensors 20 through 29 and 100, the microcomputer performs predetermined calculations which will be described later. Based on results obtained by the calculations, the microcomputer outputs control signals to the driving circuit 33 and the actuators 8c, 32, 34 through 38.

With reference to flowcharts shown in FIGS. 5 through 9, the automatic control processing to be executed by the microcomputer is described below.

Figure 5:
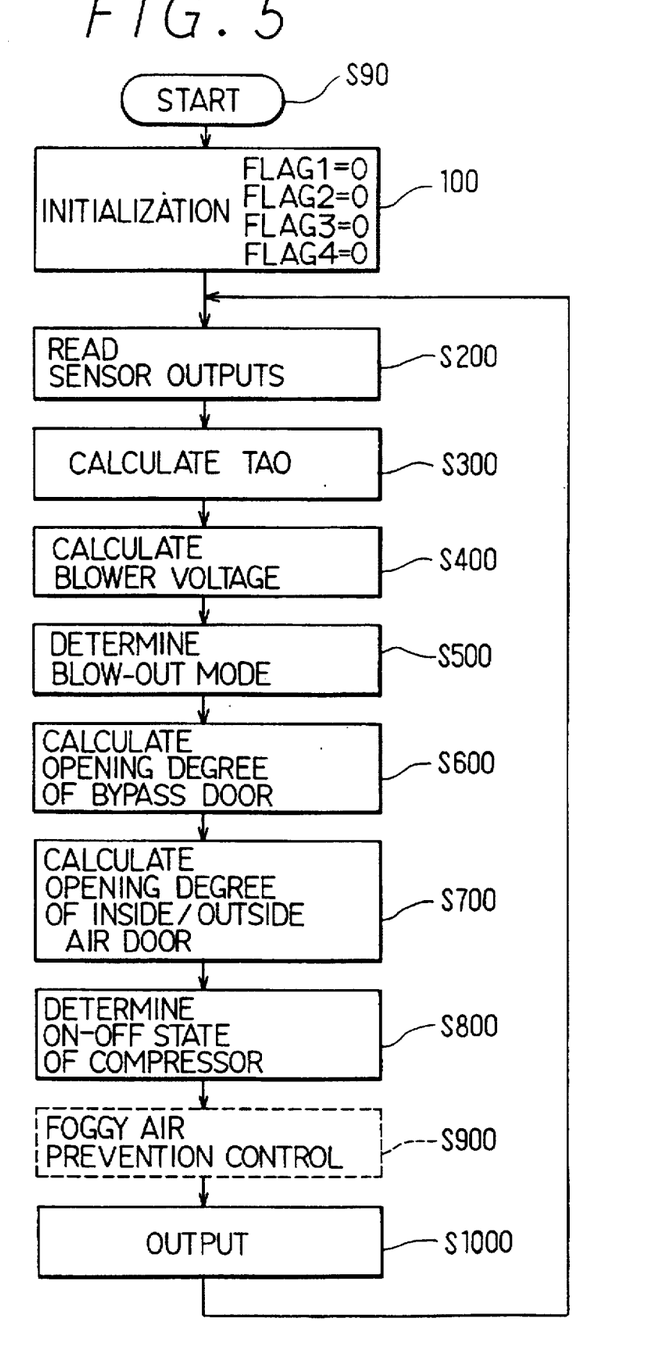
FIG. 5 is a flowchart showing a control to be executed by the air conditioning apparatus according to the embodiment.

When the automatic control processing of the air conditioning apparatus starts at step S90 by turning on the ignition switch 30, a FLAG1, a FLAG2, a FLAG3 and a FLAG4 are set to "0" to initialize data and a timer at step S100.

Then, at step S200, upon receipt of the signals outputted from the sensors 20 through 29 and 100, the microcomputer reads them.

Then, at step S300, the microcomputer calculates a target blow-out temperature TAO of air to be blown to the passenger compartment, based on data stored by the RAM and the following equation (1) stored by the ROM:

$$TAO=Kset \times Tset-Kr \times Tr-Kam \times Tam-Ks \times Ts+C \quad \text{[Equation 1]}$$

where Tset is a desired temperature set by the temperature setting switch 27; Tr, Tam, and Ts are digital values converted from analog values of signals outputted to the controller 19 from each of the inside air temperature sensor 20, the outside air temperature sensor 21, and the insolation sensor 22; and Kset, Kr, Kam, Ks, and C are correction constants.

Figure 6:
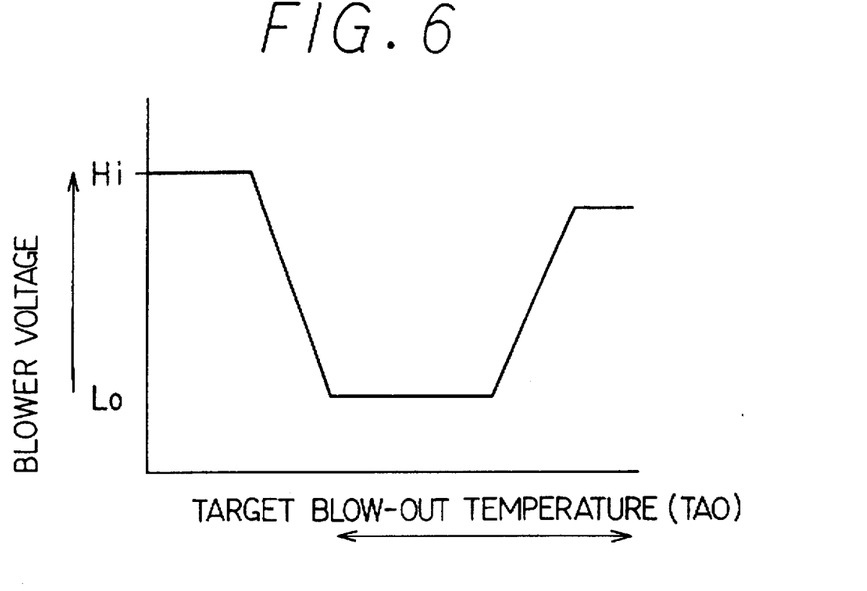
FIG. 6 is a characteristic view showing the relationship between a target blow-out temperature TAO and a blower voltage in the embodiment.

At step S400, the microcomputer determines a blower voltage to be applied to the fan motor 6b, based on the target blow-out temperature TAO and the relationship between the target blow-out temperature TAO and the blower voltage, shown in FIG. 6, stored by the ROM.

Figure 7:
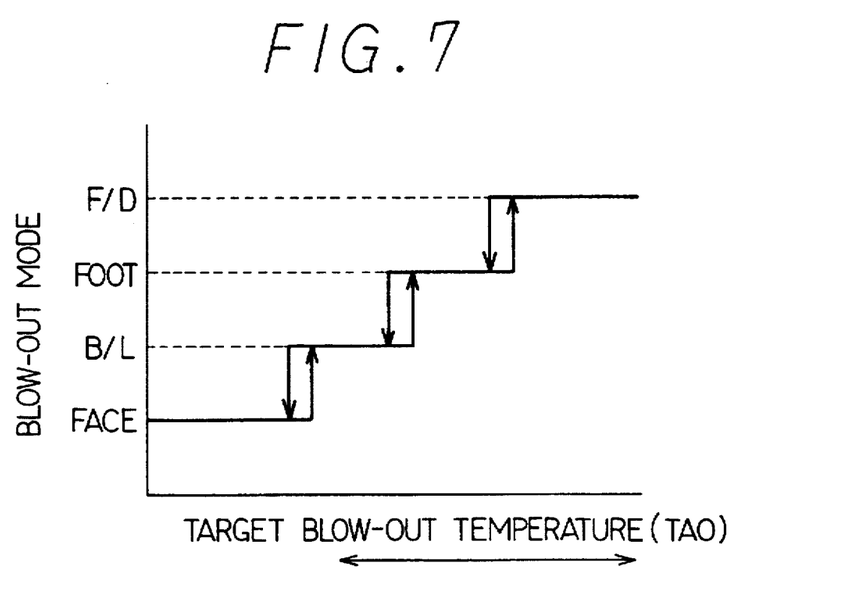
FIG. 7 is a characteristic view showing the relationship between the target blow-out temperature TAO and a blow-out mode.

At step S500, the microcomputer determines the blowout mode, based on the target blow-out temperature TAO and the relationship between the target blow-out temperature TAO and the blowout mode, shown in FIG. 7, stored by the ROM. In the face mode previously described, 100% of the conditioned air is blown out from the face air outlet toward the upper half of the passenger's body. In the bi-level (B/L) mode, about 50% of the conditioned air is blown out from the face air outlet toward the upper half of the passenger's body, and about 50% of the conditioned air is blown out therefrom toward the passenger's feet.

In the foot mode, about 90% of the conditioned air is blown out from the foot air outlet toward the passenger's feet. In the foot defroster (F/D) mode, about 50% of the conditioned air is blown out from the foot air outlet toward the passenger's feet, and about 50% of the conditioned air is blown out from the defroster air outlet toward the inner surface of the windshield glass.

The defroster mode in which 100% of the conditioned air is blown out from the defroster air outlet is not determined by the target blow-out temperature TAO, but set by the defroster switch 28 installed on the operation panel.

Figure 8:
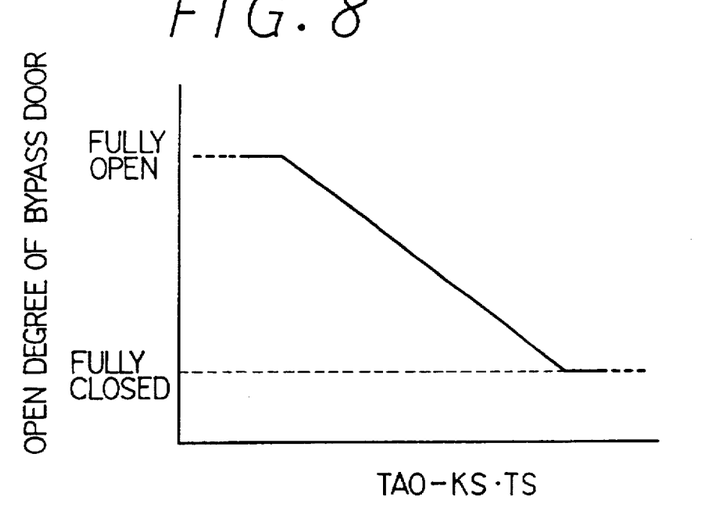
FIG. 8 is a characteristic view showing the relationship between the target blow-out temperature TAO and the open degree of a bypass door in the embodiment.

At step S600, the opening degree of the bypass door 13 is determined, based on the target blow-out temperature TAO, Ks×Ts which is the insolation correction term, and the characteristic shown in FIG. 8. Cold air does not flow through the bypass duct 12 when the bypass door 13 has fully closed the bypass duct 12.

Figure 9:
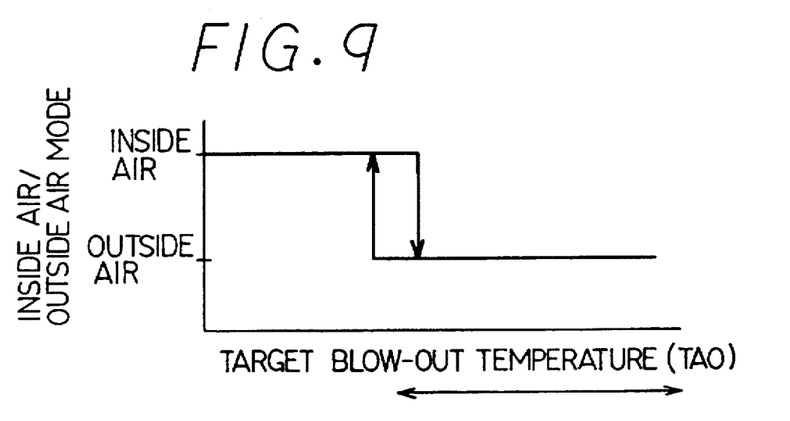
FIG. 9 is a characteristic view showing the relationship between the target blow-out temperature TAO and an inside/outside air mode in the embodiment.

At step S700, the inside air/outside air mode is determined based on the target blow-out temperature TAO and the characteristic shown in FIG. 9.

Figure 10:
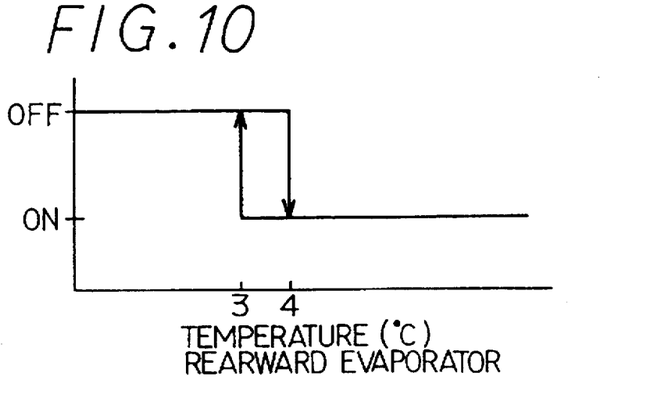
FIG. 10 is a view showing the operation of a compressor with respect to a temperature of air having just passed through the evaporator.

At step S800, it is determined based on the temperature Te of the air having just passed through the evaporator 7a or the nearby air and the characteristic shown in FIG. 10 whether or not the compressor 7b should be actuated by turning on the electromagnetic clutch 34.

At step S900, a control for preventing the foggy air from being generated is executed. The control method will be described later in detail.

At step S1000, the microcomputer outputs control signals to the driving circuit 33 and the actuators 8c, 32, 34 through 38 to obtain the air conditioning state determined at steps S400 through S900. Upon termination of the execution at step S1000, the microcomputer enters a waiting state, i.e., the microcomputer waits for a predetermined control cycle τ. When the control cycle τ has passed, the process returns to step S200.

Figure 11:
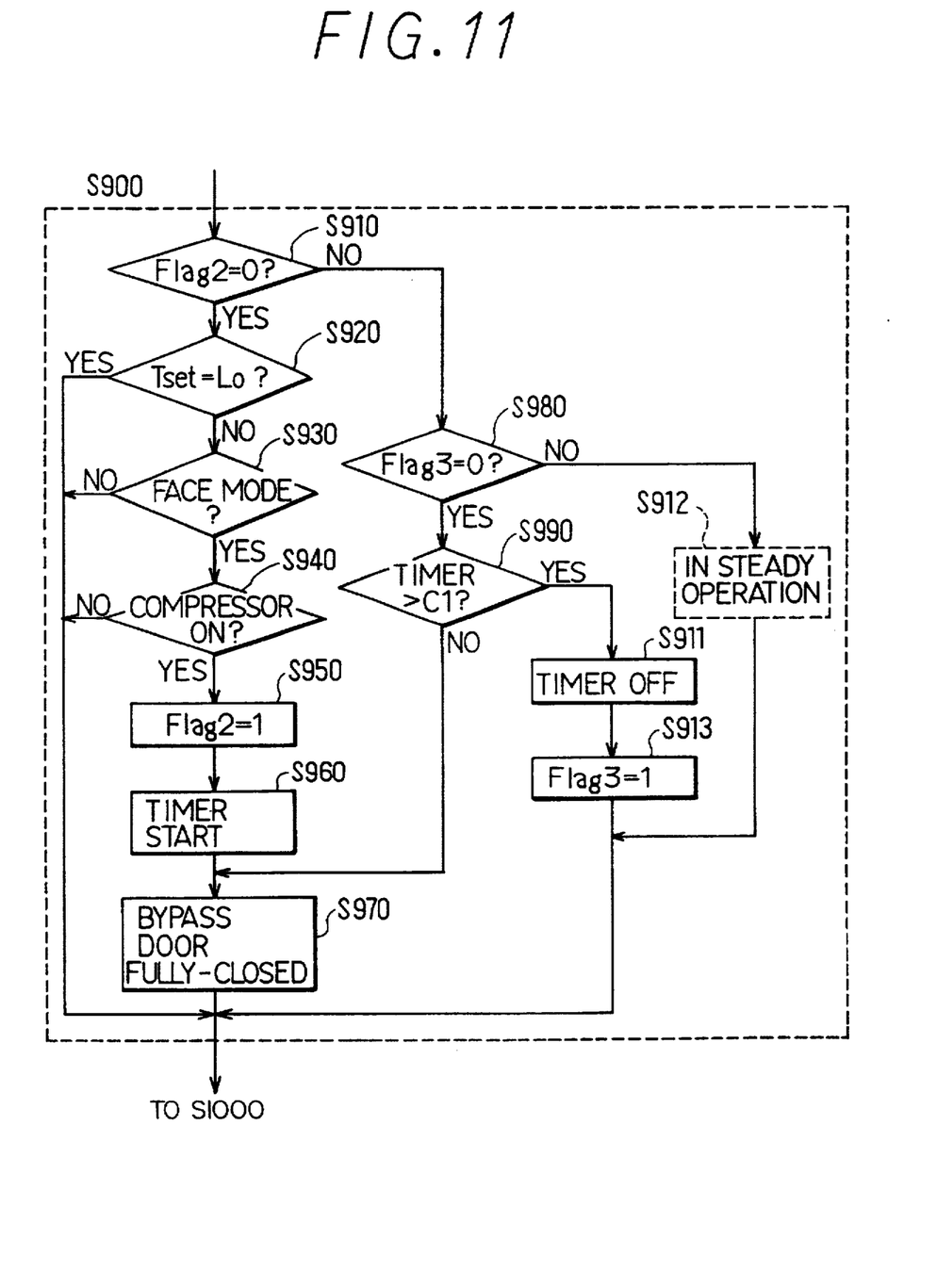
FIG. 11 is a flowchart showing main operations for preventing foggy air from being generated in the embodiment.

With reference to flowcharts shown in FIGS. 11 and 12, the control method for preventing the foggy air from being generated is described below in detail.

It is determined at step S910 whether or not the FLAG2 has been set to "0" to determine whether or not the air conditioning apparatus 1 has been operated. In other words, it is determined at step S910 whether the compressor 7b has not been driven (OFF state), i.e., whether refrigerant is not supplied to the evaporator 7a or whether the compressor 7b has been driven (ON state), i.e., whether the refrigerant is supplied to the evaporator 7a. If the ignition switch 30 is OFF, the operation of the air-conditioning apparatus 1 is stopped and hence, the compressor 7b is OFF.

If YES at step S910, the process goes to step S920, whereas if NO at step S910, the process goes to step S980.

At step S920, it is determined whether a temperature set by the temperature-setting switch 27 is the predetermined lowest temperature Lo. If YES at step S920, the process goes to step S1000 at which the microcomputer outputs control signals to the driving circuit 33 and the actuators 8c, 32, 34 through 38 to obtain the air conditioning state determined at steps S400 through S800. As a result, the components of the air conditioner 1 are driven. If NO at step S920, the process goes to step S930.

At step S930, it is determined whether or not the blow-out mode set at step S500 is the face mode. As indicated in FIG. 7 showing the relationship between the target blow-out temperature TAO and the blow-out mode, the face mode is set when the target blow-out temperature TAO is low, i.e., when it is necessary to cool the air in the passenger compartment because the temperature of the outside air to be introduced into the casing 2 is high. If YES, the process goes to step S940, whereas if NO, the process goes to step S1000.

At step S940, it is determined whether or not the compressor 7b is ON or OFF, based on the determination performed at step S800. That is, if the temperature Te of the air having passed through the evaporator 7a is higher than 4° C., it is determined that the compressor 7b is ON, whereas if the temperature Te is lower than 3° C., it is determined that the compressor 7b is OFF. If YES at step S940, the process goes to step S950, whereas if NO at step S940, the process goes to step S1000.

At step S950, the FLAG2 is set to "1". Then, the process goes to step S960 at which the timer starts counting time. Then, the process goes to step S970 at which it is determined that the bypass door 13 fully closes the bypass duct 12. At step S1000, a signal indicating the determination performed at step S970 is outputted from the controller 19 to the servo motor 35 to fully close the bypass duct 12 with the bypass door 13.

A series of the processing step to be executed from step S910 through step S970 is described below in detail. Needless to say, the compressor 7b is OFF when the air conditioning apparatus 1 is not actuated and should have been ON for a certain period of time before it turns OFF.

When the temperature of the outside air is high and the compressor 7b is ON, vapor condenses on the surface of the evaporator 7a, and the condensed water is blown off from the evaporator 7a, thus adhering to the surface of the heater core 8a. If the compressor 7b is OFF for a long time, the temperature of the heater core 7a rises to a temperature close to the temperature of the outside air. When the compressor 7b is turned on thereafter, the evaporator 7a cools air rapidly.

As a result, the temperature of air passing through the bypass duct 12 drops. Air passing through the heater core 8a after having passed through the evaporator 7a is heated to some degree by the heat of the heater core 8a. Consequently, the temperature of the air which has passed though the heater core 8a becomes much higher than that of the air which passing through the bypass duct 12. In this state, foggy air is likely to be generated.

Most of air cooled by the evaporator 7a passes through the heater core 8a when a very small amount of the engine-cooling water is supplied to the heater core 8a. As a result, the heater core 8a is cooled. When the compressor 7b is turned off thereafter by the passenger although the air conditioning apparatus 1 is in operation, the cooling performance of the evaporator 7a decreases. Therefore, the higher the temperature of the air introduced into the casing 2, the more the air in a vicinity of the surface of the heater core 8a condenses.

When the air conditioning apparatus 1 is actuated and the compressor 7b is turned on, with condensed water adhered to the heater core 8a, the relative humidity of the air cooled by the evaporator 7a becomes 100%. The cold air is distributed to the bypass duct 12 and the heater core 8a according to the opening degree of the bypass door 13.

The cold air fed to the heater core 8a is heated when it passes therethrough. Even though the engine-cooling water is not supplied to the heater core 8a at this time, the heater core 8a serves as a heating source, because of its thermal capacity and the heat transmitted thereto from the hot water pipe 8d, thus increasing the temperature of the cold air to some extent.

When the cold air, which has a relative humidity of 100% is heated, the relative humidity should decrease. But actually, there is condensed water which has adhered to the heater core 8a as described previously. Thus, when the cold air passes through the heater core 8a, it absorbs the condensed water, thus keeping the relative humidity at 100%.

As a result, as described previously, when the air which has passed through the heater core 8a and the air which has passed through the bypass duct 12 are mixed, foggy air is generated. In order to prevent the foggy air from being generated, the controller 19 outputs a signal to the servo motor 35 to close the bypass door 13.

As described previously, if it is determined at step S920 that a temperature set by the temperature-setting switch 27 is the predetermined lowest temperature Lo, i.e., if the passenger desires to have the air in the passenger compartment cooled down to the lowest temperature rapidly, the bypass duct 12 is not closed, but the bypass door 13 is controlled to have the same opening degree as that determined at step S600. In this manner, the air in the passenger compartment can be cooled rapidly according to the temperature set by the passenger. If it is determined at step S920 that the temperature set by the temperature-setting switch 27 is not the predetermined lowest temperature Lo, the process goes to step S930.

At step S910, it is determined that the FLAG2 is not set to "0", because the FLAG2 has been set to "1" at step S950 in the execution of the previous cycle. Then, the process goes to step S980.

At step S980, it is determined whether or not the FLAG3 has been set to "0". If YES, the process goes to step S990, whereas if NO, the process goes to step S912. In the present situation, it is determined at step S980 that the FLAG3 has been set to "0". Thus, the process goes to step S990.

At step S990, it is determined whether the timer started at step S960 has counted a predetermined time period C1, namely, 20 seconds. If NO at step S990, the process goes to step S970 at which the bypass duct 12 is kept to be closed. If YES at step S990, the timer is turned off at step S911, and then, the process goes to step S913 at which the FLAG3 is set to "1".

The setting of 20 seconds as the predetermined time period C1 is for the purpose of reducing the temperature difference between the temperature of the air which has passed the bypass duct 12 and that of the air which has passed the heater core 8a to a smallest extent possible, by cooling the heater core 8a with the air which has passed through the evaporator 7a. Therefore, the predetermined time period C1 of the timer is not limited to 20 seconds.

The bypass door 13 may be closed when the operation of the air conditioning apparatus is stopped or when the engine is stopped. When the bypass duct 12 is closed after the engine is stopped, the operation sound of the bypass door 13 is harsh to the passenger. Therefore, preferably, the bypass duct 12 is closed while the engine is running.

The control method executed immediately after the air conditioning apparatus 1 is activated for preventing the foggy air from being generated has been described. Next, control method executed in a steady operating state of the air conditioning apparatus 1, namely, after the predetermined time period C1 has passed since the air conditioning apparatus 1 has been activated, for preventing the foggy air from being generated will be described.

In the steady operating state, after it is determined at step S910 that the FLAG2 is not set to "0" and that the FLAG3 is not set to "0" at step S980, the process goes to step S912. The processing to be executed at step S912 is described below in detail with reference to the flowchart shown in FIG. 12.

Initially, at step S914, it is determined whether the FLAG1 has been set to "1". If YES, the process goes to step S915, whereas if NO, the process goes to step S916. If the process goes to step S914 for the first time, it is determined at step S914 that the FLAG1 has not been set to "1".

The processing to be executed at step S916 is similar to that to be executed at step S920. That is, if the passenger desires to have the air in the passenger compartment cooled at the lowest temperature, the opening degree of the bypass door 13 is controlled in accordance with that determined at step S600.

The processing to be executed at step S917 is similar to that to be executed at step S930. That is, if the temperature of air introduced into the casing 2 is higher than a predetermined temperature, it is likely that vapor condenses on the surface of the evaporator 7a and that dew is adhered on the heater core 8a and hence foggy air is generated.

If it is determined at step S916 that a temperature set by the temperature-setting switch 27 is not the predetermined lowest temperature Lo, and if it is determined at step S917 that the face mode is selected as the blow-out mode, the process goes to step S918.

At step S918, it is determined whether TAO−Ks×Ts to be used to determine the opening degree of the bypass door 13 is greater than a predetermined value of −20. TAO−Ks×Ts represents the cooling load of the air conditioning apparatus 1. Thus, it is determined at step S918 whether the cooling load is greater than the predetermined value of −20. The reason step S918 is provided is as follows: If the cooling load is greater than −20, a required cooling performance cannot be obtained and thus a temperature control cannot be accomplished appropriately unless the bypass door 12 is open. Further, when the passenger presses the A/C switch 40 to turn off the compressor 7b, the bypass door 12 is fully closed and hence the required cooling performance cannot be obtained, with the result that the passenger feels uncomfortable. If NO at step S918, the process goes to step S1000 at which the bypass door 13 is controlled to have the same opening degree as that determined at step S600.

At step S918, it is also determined whether the compressor 7b has been switched from ON to OFF or from OFF to ON.

If it is determined that the operating state of the compressor 7b has been switched from ON to OFF or from OFF to ON, the process goes to step S919 at which the bypass door 13 is controlled to fully close the bypass duct 12 therewith, and the FLAG1 is set to "1".

In the state in which the compressor 7b is switched from OFF to ON, foggy air is likely to be generated, as described previously. The reason why a determination of whether the compressor 7b has been switched from ON to OFF is made is as follows:

That is, the compressor 7b is switched from OFF to ON by the A/C switch 40 or automatically based on the temperature of the air having just passed through the evaporator 7a. When the compressor 7b is automatically controlled based on the temperature of the air having passed through the evaporator 7a, the compressor 7b is switched from OFF to ON or from ON to OFF at intervals of 30–60 seconds. That is, when the compressor 7b is turned off, it is assumed that it will be turned on in 30–60 seconds.

In consideration of the above, the bypass door 13 closes the bypass duct 12 when the compressor 7b is turned off.

If the cooling load (TAO–Ks×Ts) is greater than the predetermined value of –20, i.e., if the required cooling load is small, the bypass door 12 is fully closed to make the passenger comfortable.

Then, the process returns to step S914 again. If YES at step S914, the program goes to step S915.

At step S915, it is determined whether or not the cooling load (TAO–Ks×Ts) is greater than a predetermined value of –26. If the load is greater than the predetermined value, a necessary cooling performance cannot be obtained unless the bypass door 13 is open. In this case, the process goes to step S920 at which the FLAG1 is set to "0" to control the bypass door 13 to have the same opening degree as that determined at step S600. The reason why the predetermined value is set at –20 at step S918 and at –26 at step S915 is because hysteresis is provided to prevent the bypass door 13 from being opened and closed too quickly.

As apparent from steps S915 and S918, the bypass door 13 is fully closed in a second predetermined period of time in which the cooling load (TAO–Ks×Ts) is small.

As described above, in a particular air conditioning state, namely, when the compressor 7b is turned on and the temperature of air introduced into the casing 2 is higher than the predetermined temperature, foggy air is likely to be generated. The bypass door 13 is fully closed in the particular air conditioning state to prevent the foggy air from being generated.

When the cooling load of air conditioning apparatus 1 is greater than the predetermined value, the bypass door 13 is controlled to have an opening degree in accordance with the degree of the cooling load to provide a comfortable air conditioning state.

Further, in the embodiment, the evaporator 7a, the heater core 8a, and the bypass door 13 are provided so that the air which has passed through the evaporator 7a is capable of passing through the heater core 8a, regardless of whether the bypass door 13 is fully open or closed. That is, in the conventional air conditioning apparatus adopting the air-mixing method, the air-mixing door prevents air from passing through the heater core 8a, however, in the air-conditioning apparatus of this embodiment, the air-mixing door does not prevent air from passing through the heater core 8a at any positions thereof, the heater core 8a is cooled easily and thus, dew is likely to be adhered on the heater core 8a. Therefore, in the air-conditioning apparatus of this embodiment, the remarkable effect can be obtained.

Modifications of the present invention are described below with reference to FIGS. 13.

Figure 12:
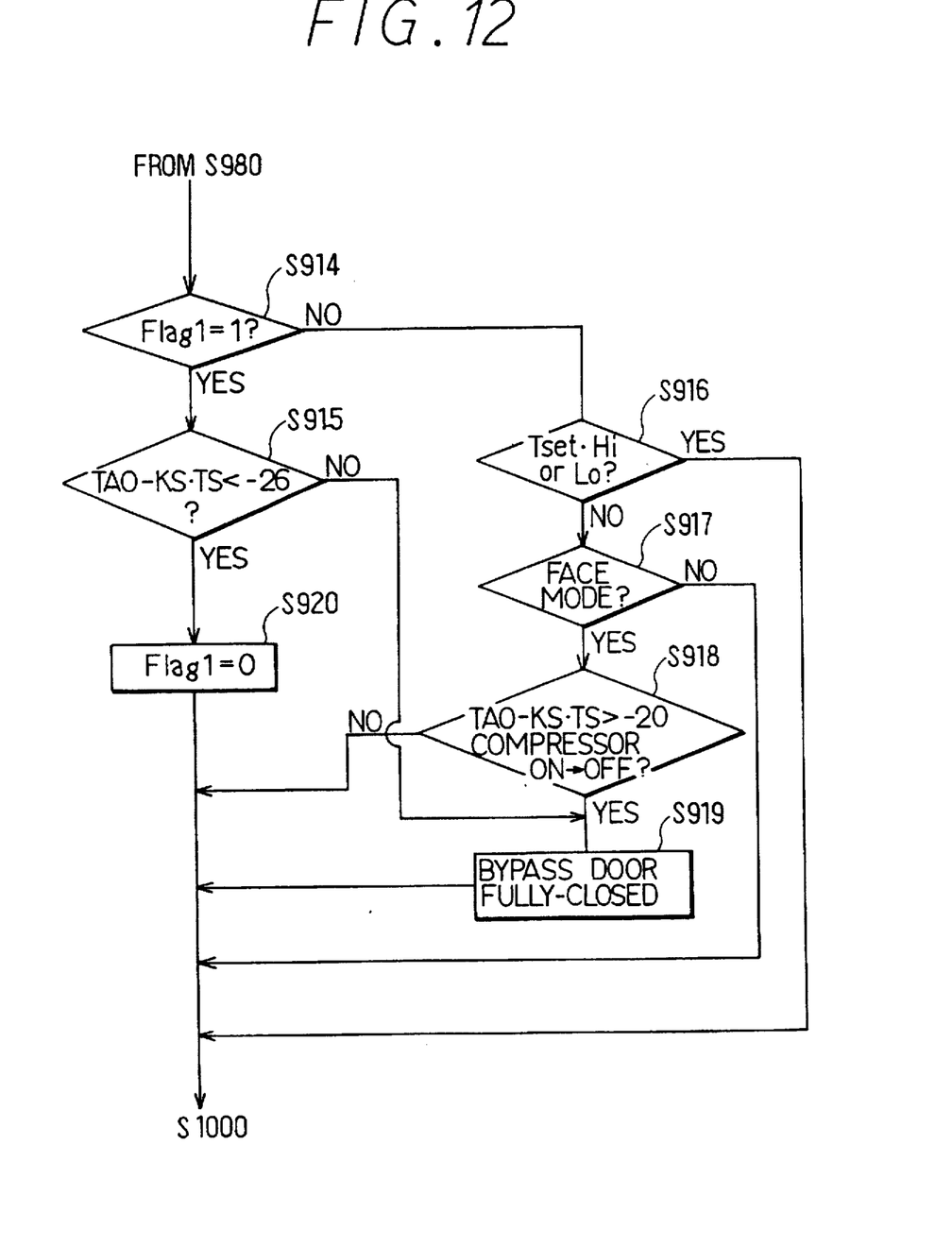
FIG. 12 is a flowchart showing main operations for preventing foggy air from being generated in the embodiment.
Figure 13:
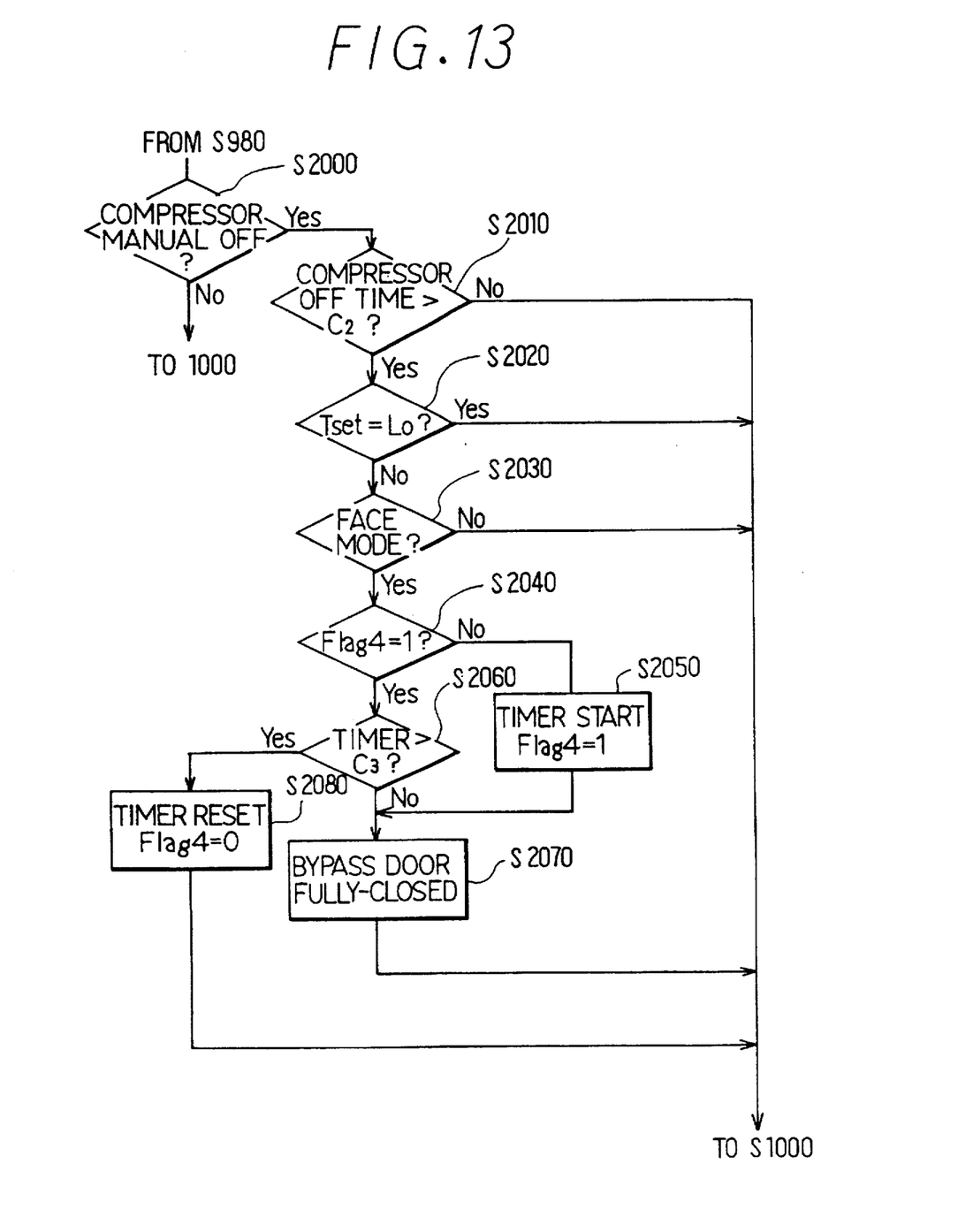
FIG. 13 is a flowchart showing operations for preventing foggy air from being generated in another embodiment.

FIG. 13 shows a flowchart of a modification of the flowchart shown in FIG. 12. Initially, a FLAG4 is set to "0" to initialize data and a timer.

At step S2000, it is determined whether the compressor 7b has been turned off by the A/C switch 40. If YES at step S2000, the process goes to step S2010.

At step S2010, it is determined whether an OFF period of time of the compressor 7b set by the A/C switch 40 has exceeded a predetermined period of time C2, namely, 20 seconds. If YES at step S2010, the process goes to step S2020, whereas if NO at step S2010, the process goes to step S1000.

The processing to be executed at step S2020 and that to be executed at step S2030 are similar to that to be executed at step S920 and step S930, respectively. Therefore, the description of the processing to be executed at steps S2020 and S2030 is omitted herein.

At step S2040, it is determined whether a FLAG4 has been set to "1". If YES, the process goes to step S2060, whereas if NO, the process goes to step S2050 at which the timer starts counting time and the FLAG4 is set to "1", and then, the process goes to step S2070 to output a signal from the controller 19 to the servo motor 35 to fully close the bypass door 13.

At step S2060, it is determined whether a period of time counted by the timer has exceeded a predetermined period of time C3, namely, 20 seconds. If YES at step S2060, the process goes to step S2080 to reset the timer and reset the FLAG4 to "0", whereas if NO at step S2060, the process goes to step S2070 to output a signal from the controller 19 to the servo motor 35 to fully close the bypass door 13.

An operation to be executed in the flowchart of FIG. 13 is described below.

In order to turn on the compressor 7b after the compressor 7b is turned off by pressing the A/C switch 40, it is necessary to press the A/C switch 40 again or the automatic switch 40. Accordingly, the compressor 7b keeps an OFF state if the A/C switch 40 or the automatic switch 41 is turned on.

That is, when the temperature of the outside air is high, the heater core 8a has a small heating performance. As a result, only a small amount of hot water flows through the hot water pipe 8d, and the heater core 8a is cooled by cold air delivered from the evaporator 7a. Thus, if the OFF time period of the compressor 7b is long, the cooling performance of the evaporator 7a becomes gradually smaller due to a heat exchange between the inside air and the outside air. As a result, the temperature of the air which is fed to the heater core 8a through the evaporator 7a becomes higher than that of the heater core 8a.

Consequently, dew may be formed on the surface of the heater core 8a and thus foggy air is likely to be generated. If a long OFF time period of the compressor 7b continues, the evaporator 7a is incapable of cooling the outside air introduced into the casing 2. Hence, the outside air introduced into the casing 2 is delivered to the heater core 8a without being cooled. In this case, when the temperature of the outside air is high and the flow rate of hot water to be supplied to the heater core 8a is low, the heater core 8a may be heated. Accordingly, when the compressor 7b is turned on thereafter, there is a great difference in temperature between the air passing through the heater core 8a and the air passing through the bypass duct 12. As a result, foggy air is likely to be generated.

In order to prevent the foggy air from being generated, the following processing is executed: At step S2010, if it is determined that the OFF time period of the compressor 7b has exceeded the predetermined period of time C2, and it is determined at step S2040 that the FLAG4 has not been set to "1", then the timer starts counting time at step S2050, and then, the bypass duct 12 is closed at step S2070 for the predetermined time period C3, namely, 60 seconds after the compressor 7b is turned on. In this manner, the foggy air can be effectively prevented from being generated when the compressor 7b is turned off by the passenger with the A/C switch 40.

Until the predetermined time period C3 has passed, it is determined at step S2040 that the FLAG4 has been set to "1"

and the bypass duct 12 is kept to be closed. When the predetermined time period C3 has passed, at step S2080, the timer is reset and the FLAG4 is set to "0". Then, the process goes to step S1000.

In the above modification, it is determined whether the compressor 7b is turned off by the A/C switch 40. But, it is possible to close the bypass door 13 according to whether the OFF period of time of the compressor 7b has exceeded a predetermined period of time when the compressor 7b is controlled automatically, namely, when it is turned on and off based on the temperature Te of the air having passed through the evaporator 7a.

In the above-described embodiment, whether the air introduced into the casing 2 is high or low is determined according to the blow-out mode based on the target blow-out temperature TAO of the air to be blown to the passenger compartment, however, it is possible to determine whether the air introduced into the casing 2 is high or low according to the target blow-out temperature TAO or a value detected by the sensor 21 for detecting the temperature of the outside air.

Further, it is also possible that, at step S916, it is determined at step S916 whether the inside air/outside air mode is the inside air mode or the outside air mode, and if it is determined that the inside air/outside air mode is the inside air mode, the process goes to step S1000, whereas if it is determined that the inside air/outside air mode is the outside air mode, the process goes to step S917. That is, at step S916, the temperature of the air in the passenger compartment is not so high because the temperature of the air in the passenger compartment is close to the set temperature. More specifically, even though the air in the passenger compartment is introduced into the casing 2 in the inside air mode, there is a low possibility that dew is adhered on the surface of the heater core 8a and thus it is unlikely that foggy air is generated.

A reheating type air conditioning apparatus has been described. That is, the heating performance of the heater core 8a is adjusted to adjust the temperature of the air in the passenger compartment, however, it is possible for the air conditioning apparatus to adopt the air-mixing method of adjusting the ratio between the amount of cold air and that of warm air by means of the air-mixing door, for example, an air conditioning apparatus has a bypass duct to improve the cooling performance thereof.

Although the present invention has been completely described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An air-conditioning apparatus for use in a vehicle comprising:

a casing for forming an air duct for introducing air and having a plurality of air outlets at the most downstream end thereof to blow out conditioned air into a passenger compartment;

a blower disposed in the casing for directing an air flow to said passenger compartment;

an evaporator disposed in said casing for cooling air passing therethrough;

a heater core disposed at a downstream side of said evaporator for heating air passing therethrough;

bypass means disposed in said casing for forming a bypass duct to allow the air which has passed through the evaporator to bypass said heater core;

opening/closing means for opening and closing said bypass duct;

refrigerant control means for switching between a supply state in which refrigerant is supplied to said evaporator to a stop state in which the supply of the refrigerant to the evaporator is stopped based on a temperature of air having just passed through said evaporator;

physical amount determination means for determining whether or not a physical amount relating to the temperature of the air introduced into said casing is greater than a predetermined amount; and control means for controlling said opening/closing means so as to obtain a state in which said bypass duct is closed for a first predetermined time period, when said physical amount determination means determines that said physical amount relating to the temperature of the air introduced into said casing is greater than said predetermined amount and when the control state of said refrigerant control means is switched from said stop state to said supply state.

2. An air conditioning apparatus according to claim 1, further comprising:

actuation determination means for determining whether the control state of said refrigerant control means is switched from said stop state to said supply state when said air conditioning apparatus is actuated, wherein when the actuation determination means determines that the control state of said refrigerant control means has been switched from said stop state to said supply state, said control means controls said opening/closing means to close said bypass duct for said first predetermined time period.

3. An air conditioning apparatus according to claim 2, wherein when said physical amount determination means determines that a physical amount relating to the temperature of the air introduced into said casing is greater than said predetermined amount and when it is determined that the control state of said refrigerant control means has been switched from said stop state to said supply state, said control means controls said opening/closing means to close said bypass duct for said first predetermined time period.

4. An air conditioning apparatus according to claim 1, further comprising time period determination means for clocking a time period in said stop state when it is determined that the control state of said refrigerant control means has been switched from said supply state and thereafter said control state thereof has been switched from said supply state to said stop state, to determine whether the clocked time period has exceeded a second predetermined time period after said air conditioning apparatus is actuated, wherein when said time period determination means determines that said second predetermined time period has passed, said control means controls said bypass duct to close the opening/closing means for said second predetermined time period, after it is determined that the control state of said refrigerant control means has been switched from said stop state to said supply state.

5. An air conditioning apparatus according to claim 1, further comprising a manual determination means for determining whether the control state of said refrigerant control means has been manually switched from said supply state to said stop state; and a time period determination means for clocking a time period after the manual determination means determines that the control state of said refrigerant control means has been manually switched from said supply state to said stop state, to determine whether said clocked time period has exceeded a second predetermined time period, wherein when said time period determination means determines that said second predetermined time period has passed, said control means controls said bypass duct to close said opening/closing means for said first predetermined time period, after it is determined that the control state of said refrigerant control means has been switched from said stop state to said supply state.

6. An air conditioning apparatus according to claim 1, further comprising cooling load determination means for determining whether a cooling load of said air conditioning apparatus in said passenger compartment is greater than a predetermined value; and an opening/closing control means for prohibiting a control content of said control means from executing when said cooling load determination means determines that said cooling load is greater than said predetermined value and controlling an operation of said opening/closing means according to a degree of said cooling load.

7. An air conditioning apparatus according to claim 1, further comprising temperature setting means (27) for setting a temperature of air in said passenger compartment; temperature detection means for detecting the temperature of the air in said passenger compartment; and target blow-out air temperature calculation means for calculating a target blow-out air temperature, based on said temperature set by said temperature setting means and said temperature detected by said detection means for detecting said temperature of the air in the passenger compartment.

8. An air conditioning apparatus according to claim 7, wherein said temperature determination means determines whether said target blow-out air temperature is lower than a predetermined temperature.

9. An air conditioning apparatus according to claim 7, wherein said cooling load determination means determines whether a temperature detected by said temperature detection means for detecting the temperature of the air in said passenger compartment is the lowest temperature in a range of a temperature which can be detected by the temperature detection means for detecting the temperature of the air in said passenger compartment.

10. An air conditioning apparatus according to claim 1, wherein said evaporator, said heater core, said opening/closing means are provided in said casing in such a manner that air which has passed through said evaporator passes through said heater core in both a state in which said bypass duct is open and in a state in which said bypass duct is closed.

11. A method for controlling an air-conditioning apparatus for use in a vehicle, said air-conditioning apparatus including: a casing for forming an air duct for introducing air and having a plurality of air outlets at the most downstream end thereof to blow out conditioned air into a passenger compartment; a blower disposed in the casing for directing an air flow to said passenger compartment; an evaporator disposed in said casing for cooling air passing therethrough; a heater core disposed at a downstream side of said evaporator for heating air passing therethrough; bypass means disposed in said casing for forming a bypass duct to allow the air which has passed through the evaporator to bypass said heater core; opening/closing means for opening and closing said bypass duct; refrigerant control means for switching between a supply state in which refrigerant is supplied to said evaporator to a stop state in which the supply of the refrigerant to the evaporator is stopped based on a temperature of air having just passed through said evaporator;

said method comprising:
a physical amount determination step for determining whether or not a physical amount relating to the temperature of the air inside said passenger compartment or the air outside said passenger compartment is greater than a predetermined amount; and
control step for controlling said opening/closing means so as to obtain a state in which said bypass duct is closed for a first predetermined time period, when said physical amount relating to the temperature of the air introduced into said casing is greater than said predetermined amount and when the control state of said refrigerant control means is switched from said stop state to said supply state.

12. An air-conditioning apparatus for use in a vehicle comprising:
a casing for forming an air duct for introducing air and having a plurality of air outlets at the most downstream end thereof to blow out conditioned air into a passenger compartment;
a blower disposed in the casing for directing an air flow to said passenger compartment;
an evaporator disposed in said casing for cooling air passing therethrough;
a heater core disposed at a downstream side of said evaporator for heating air passing therethrough;
bypass means disposed in said casing for forming a bypass duct to allow the air which has passed through the evaporator to bypass said heater core;
opening/closing means for opening and closing said bypass duct;
refrigerant control means for switching between a supply state in which refrigerant is supplied to said evaporator to a stop state in which the supply of the refrigerant to the evaporator is stopped based on a temperature of air having just passed through said evaporator;
physical amount determination means for determining whether or not a physical amount relating to the temperature of the air inside said passenger compartment or the air outside said passenger compartment is greater than a predetermined amount; and
control means for controlling said opening/closing means so as to obtain a state in which said bypass duct is closed for a first predetermined time period, when said physical amount determination means determines that said physical amount is greater than said predetermined amount and when the control state of said refrigerant control means is switched from said stop state to said supply state.

* * * * *